United States Patent

Halford et al.

[11] Patent Number: 5,454,587
[45] Date of Patent: Oct. 3, 1995

[54] CONNECTOR FOR MOUNTING INFLATOR IN AIRBAG MODULE

[75] Inventors: Rick L. Halford, Midvale; Michael H. Wong, Ogden; Jeffrey A. Summers, North Ogden, all of Utah

[73] Assignee: Morton International, Inc., Chicago, Ill.

[21] Appl. No.: 272,242

[22] Filed: Jul. 8, 1994

[51] Int. Cl.⁶ .................................................. B60R 21/16
[52] U.S. Cl. .................. 280/728.1; 280/736; 280/732; 403/348
[58] Field of Search ............... 280/728 A, 728 R, 280/741 R, 736, 743 R, 731, 732; 403/348, 349, 367

[56] References Cited

U.S. PATENT DOCUMENTS

| | | | |
|---|---|---|---|
| 5,087,069 | 2/1992 | Corbett et al. | 280/731 |
| 5,094,148 | 3/1992 | Haber et al. | 403/348 X |
| 5,199,834 | 4/1993 | Seidl et al. | 280/728 A X |
| 5,234,227 | 8/1993 | Webber | 280/728 A |
| 5,277,442 | 1/1994 | Cuevas | 280/731 |
| 5,332,256 | 7/1994 | Lauritzen et al. | 280/732 |

FOREIGN PATENT DOCUMENTS

| | | | |
|---|---|---|---|
| 5065048 | 3/1993 | Japan | 280/728 A |
| 5193432 | 8/1993 | Japan | 280/728 A |

Primary Examiner—Kenneth R. Rice
Assistant Examiner—Christopher Ellis
Attorney, Agent, or Firm—George W. Rauchfuss, Jr.; Gerald K. White

[57] ABSTRACT

In an airbag module comprising an inflator inside a canister the inflator is fastened inside the canister by means of a plug and socket connector which comprises a plug member and a socket member. One member of the connector is fastened to an end of the inflator and the other member of the connector is fastened to a wall of the canister. To join the inflator to the canister the plug member is inserted into the socket member and one member is turned relative to the other through a small arc less than one turn to tighten the connection.

12 Claims, 2 Drawing Sheets

CONNECTOR FOR MOUNTING INFLATOR IN AIRBAG MODULE

FIELD OF THE INVENTION

The invention relates to improvements in vehicle airbag restraint systems and particularly to improvements in airbag module construction. More particularly the invention relates to improved means for mounting an inflator in such a module. The inflator is the member of the module that generates and emits gas to inflate the airbag upon actuation of the device.

BACKGROUND OF THE INVENTION

In several airbag module constructions, and particularly in those intended for passenger side use in an automobile, an inflator, also called a gas generator, is mounted inside a canister. In a typical construction the canister, which is sometimes called the reaction can, contains the inflator mounted by attachment to a wall of the canister. The canister opens to the inside of an airbag so that upon actuation of the inflator, gas emitted by the inflator will first enter the canister and from there inflate and deploy the airbag. Airbag modules typical of the kind to which the present invention relates are known and have been described in a number of patents, such as U.S. Pat. No. 4,941,687, No. 5,069,480, and No. 5,096,222, for example.

BRIEF SUMMARY OF THE INVENTION

According to the invention, in an airbag module of the kind described, a cylindrical inflator is mounted inside a canister, attached to a canister wall by means of a plug and socket connector. The plug and socket connector comprises two members, a plug and a socket. Those members can be engaged for connection by inserting the plug in the socket and then turning either the plug or the socket relative to the other through an arc of less than one turn. The members can be disengaged by reversing that procedure. For use in the invention, one member of the connector is fixed to one end of an inflator and the other member is fixed to a wall of the canister. To mount the inflator inside the canister, it is inserted into the canister and the two members of the connector are engaged for connection by inserting the plug member into the socket member and turning the inflator a fraction of one turn to close the connection. One advantage of using a plug and socket connector according to the invention is that it simplifies and facilitates assembly and disassembly in manufacture and rework of the airbag module. Another advantage is that the connector can be tightened at the joint to prevent or reduce rattles caused by vibration when the automobile is running. The invention will be described in more detail by reference to the Drawings.

DETAILED DESCRIPTION OF THE INVENTION

Figure 1:
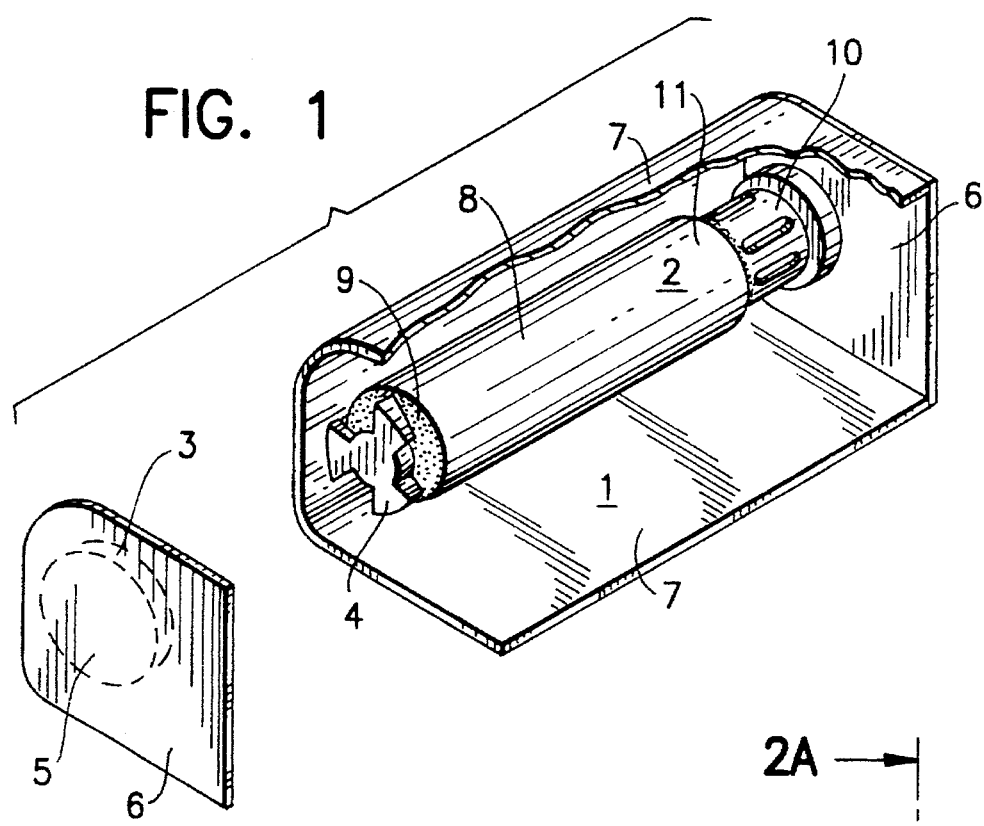
FIG. 1 is a perspective view of a typical canister for use in an airbag module, showing a cylindrical inflator mounted inside the canister by means of a plug and socket connector. The side wall of the canister on which the socket member is mounted is removed in the drawing to illustrate the plug member attached to the end of the inflator.
Figure 4:
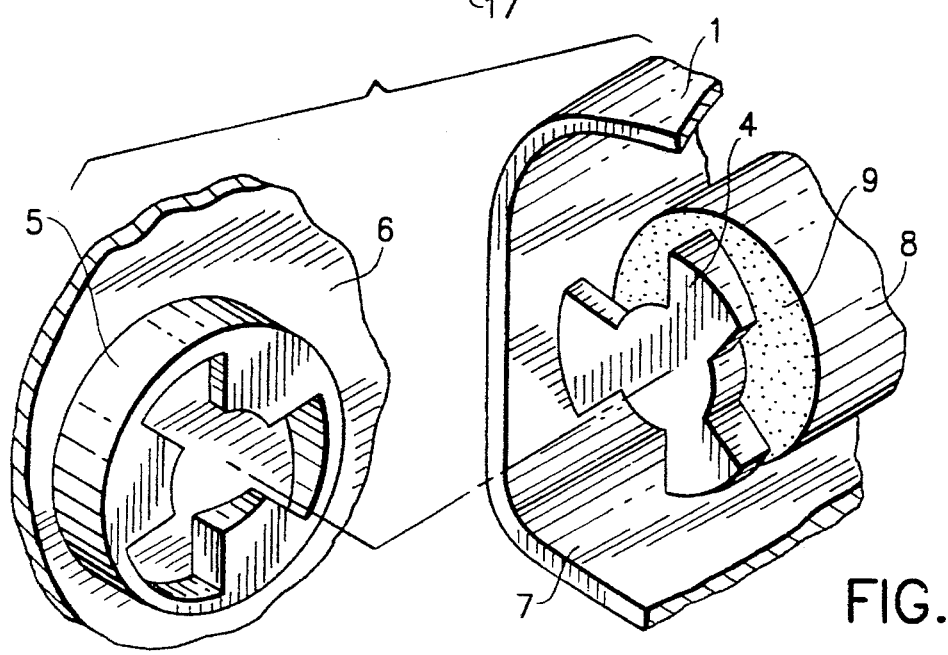
FIG. 4 is a detail view of the connector shown in FIG. 1, showing a plug member fastened to one end of a cylindrical inflator and a socket member fastened to a side wall inside a canister, and with the plug and socket disjoined to illustrate the plug and socket members of the connector fastened respectively to an inflator and a wall of a canister in a preferred embodiment of the invention.

Referring now to FIG. 1, a canister 1 is shown with an inflator 2 mounted inside the canister 1 by means of a plug and socket connector 3. As best shown in FIG. 4, a plug 4 member of the connector 3 is attached by welding to one end of a cylindrical inflator 2 and a socket 5 member is attached to an end wall 6 of the canister 1. The canister 1 is a metal box having top, bottom and rear walls 7 and two end walls 6. The front of the canister 1 opens for connection to a container (not shown) in which an airbag is folded and packed for storage.

There are several known variations of complete airbag modules which comprise an inflator contained in a canister which opens to a container with an airbag packed inside. Details of a complete airbag module do not need to be described here for full description and understanding of the present invention. The airbag is packed in its container and is connected with the canister so that the canister opens to the inside of the airbag. The opening from the canister to the inside of the airbag is sealed at its edges to retain compressed air inside the canister and the inflated bag for a period long enough to effectively restrain a driver or passenger. When the inflator is activated it generates hot compressed gas which bursts a seal at the outlet of the inflator and issues, usually through a diffuser, into the canister. The hot compressed gas in the canister expands to deploy the airbag from its container and inflates the bag for passenger restraint. In some airbag modules, the container for an airbag is in a front section of the same canister that contains the inflator. Such a structure is described for example in U.S. Pat. No. 5,096,222, and that is one known structure that can be improved in accordance with the present invention.

The inflator 2 shown in FIGS. 1 and 4 comprises a hollow metal cylinder 8 containing gas-generating substances and an igniter (not shown) which, when activated, sets off a gas generating reaction inside the inflator 2. The cylinder 8 is closed at one end 9. At the other end 11 of the cylinder 8, the inflator 2 further comprises a diffusing nozzle 10 fitted to an opening (not shown) into the cylinder 8. This opening is sealed, usually with a frangible metal seal (not shown) which ruptures as gas pressure inside the cylinder 8 increases. When the igniter is activated, hot compressed gas is generated. This ruptures the seal and gas is expelled from inside the cylinder 8 through this opening into the diffusing nozzle 10 from which the gas then diffuses into the canister 1 whence the hot compressed gas expands to deploy and inflate the airbag. In some embodiments of the invention, canisters with other diffuser arrangements can be used. The inflator may comprise an outer cylinder into which gas issues from an inner cylinder and diffuses into the canister through diffusing slots in the outer cylinder. In the embodiment shown, the canister and the inflator are of the same length and the outer end of the diffusing nozzle 10 is welded to a side wall 6 of the canister 1 opposite from the plug and socket connector.

At the closed end 9 of the cylinder 8, the center base 12 of a plug member 4 of a plug and socket connector 3 is fastened to the cylinder 8, by welding or other suitable fastening means. The face of the plug member 4 is at right angles to and concentric with the axis of the cylinder 8. See FIG. 4. At a point inside the canister 1 on a wall 6 where the end of the canister 1 is to be joined to the wall 6, a socket member 5 of the connector 3 is fastened by suitable means to the wall 6. FIG. 4 illustrates a socket 5 fastened to an end wall 6 of the canister 1. One method for fastening the socket 5 to the wall is by spot welding. In other embodiments (not shown), the socket may be formed as an integral part of the side wall. A side wall can be manufactured by sheet metal stamping, with a socket formed in the wall by a stamping process.

Figure 2:
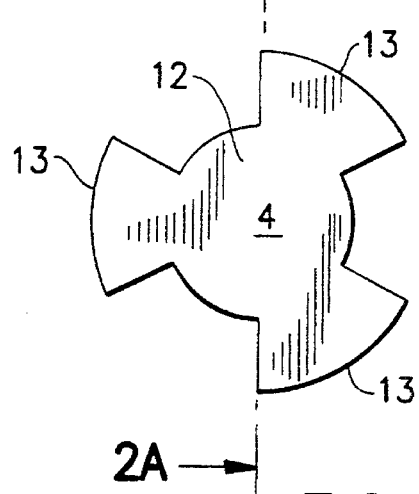
FIG. 2 is a front plan view of the socket member of a typical plug and socket connector and FIG. 2A is a cross section view of the socket along the line 2A—2A in FIG. 2.
Figure 2A:
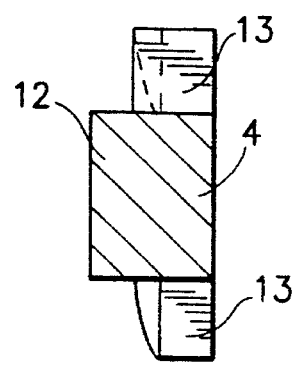

FIG. 2 shows the front of a plug member 4 having a center base 12 from which three lugs 13 extend radially outward as extended sectors in a circle of larger diameter than the base 12. The lugs 13 are symmetrically spaced around the circumference of the base 12 and are separated by radial sector spaces between the lugs. The surface opposite from the face on each lug 13 is tapered slightly, gradually widening the lug 13 from one radial edge to the other. This provides a ramp which will cooperate with a matching ramp on a socket lug to tighten the connector 3 as the lugs of the respective members are fully engaged. FIG. 2A is a cross section of the plug shown in FIG. 2, showing the wider radial edge of one lug 13 (the upper lug in FIG. 2A) and the narrower radial edge of another lug 13 (the bottom lug in FIG. 2A). The tapered surface on the bottom lug is visible in FIG. 2A. The center base 12 extends axially away from the face of the plug 4 and beyond the width of the lugs to provide a boss at the back for welding the back of the plug 4 to one end of a cylinder.

Figure 3:
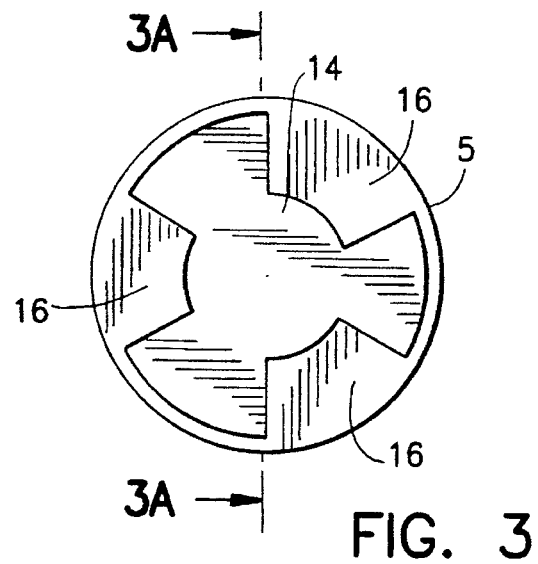
FIG. 3 is a front plan view of the plug member of the same connector and FIG. 3A is a cross section view of the plug along the line 3A—3A in FIG. 3.

The socket 5 shown in FIG. 3 comprises a circular base 14 which may be a filled circle or a ring. A cylindric rim 15 extends forward from the edge of the base 14. At the forward end of the rim 15 three radial lugs 16 extend radially inward as sectors in a circular face, defining grooves 17 between the base 14 and the lugs 16. These grooves 17 are about the same width as the thickness of the lugs 13 on the plug 4. The radial edges of the lugs 16 on the socket 5 define open radial sectors between the lugs. The radial lugs 16 are truncated to leave an open circular space at the center on the face of the socket. On the plug 4, the lugs 16 and the center base 12 at the face of the plug 4 are designed to fit through the radial and circular open spaces at the face of the socket 5. The plug 4 can be inserted through those spaces into the socket 5. The face of the plug 4 is placed against the inside surface of the base 14 of the socket 5. The plug 4 is then ready to be rotated clockwise to move its lugs 13 into grooves 17 behind the lugs 16 in the socket 5, thus closing the joint. The inside surfaces of the socket lugs 16 are tapered to match the taper on the plug lugs 13. As the joint closes, tapered surfaces on opposed lugs will join and tighten lugs 13 of the plug 4 in the grooves 17 between the base 14 and lugs 16 of socket 5.

Figure 3A:
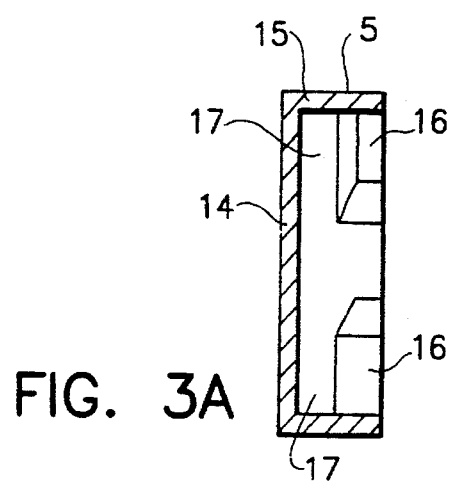

FIG. 3A shows the base 14 and cylindrical rim 15 of the socket 5 in cross section, and shows the grooves 17 between the lugs 16 and base 14 of the socket 5 and shows a tapered inside surface on one of the lugs (the upper lug 16 in FIG. 3A).

FIG. 4 shows the closed end 9 of a cylindric inflator 2 with a plug 4 of the kind described attached at the closed end 9. An end wall 6 portion of a canister is shown with a socket 5 of the kind described attached to the end wall 6. The parts are separated in the drawing to show the faces of both the plug and the socket which will be aligned for entry of the plug 4 into the socket 5 as described. With the plug 4 inserted into the socket, the inflator will be turned clockwise on its cylindric axis (or the socket may be turned counterclockwise) to turn the lugs 13 of the plug 4 under the lugs 16 of the socket 5 and thus close and tighten the joint to secure the inflator 2 inside the canister.

To assemble the inflator in the canister according to one preferred method, the side wall 6 on which the socket 5 is attached is fastened at its edges to edges of the canister walls 7 at one end of the canister. Before attaching the opposite end wall 6 to the canister that wall 6 is welded to the end of the diffusing nozzle on the inflator. The inflator is then inserted into the canister and the plug member at the other end of the inflator is inserted into the socket member of the connector. Now the end wall 6 opposite from the connector is turned clockwise thus turning the inflator to which it is welded and this turning closes the plug and socket connector. The end wall 6 attached to the diffusing nozzle is then fastened at its edges to edges of the top, bottom and rear walls 7 of the canister. Tightening the plug and socket connector in this manner pulls the end walls 6 of the canister tight against the edges of the top, bottom and side walls 7 of the canister and holds the inflator with some tension between the end walls 6 so the inflator will not rattle in the canister.

The invention is described above by reference to one preferred embodiment. The invention can be used in other airbag modules for fastening an inflator inside a canister by means of a plug and socket connector. Either the plug member or the socket member can be attached to a closed end of the inflator and the other member will be fastened to a wall, or formed as an integral part of the wall of the canister. The members of the connector will be joined to fix the inflator securely inside the canister. In some embodiments, the plug and socket connector may be the only connection of the inflator to the canister.

In some air bag modules having an inflator supported in a canister by means of a plug and socket connector in accordance with the invention, the inflator may be further supported in the canister by other means. The end of the inflator opposite from the plug and socket connector may be attached to an end wall of the canister by any suitable means. That end of the inflator may fit into a recessed boss in the side wall, or it may be welded to the side wall. The inflator may be supported in apertures through intermediate panels inside the canister.

The connector described is one of several variations of a kind of connectors sometimes called breech closures or bayonet connections. A typical breech closure comprises radial lugs and spaces on the circumference of a breech block which mate with matching spaces and lugs at the face of the breech of a gun barrel. The breech block (the plug) is inserted into the breech (the socket) and turned a fraction of one turn to move the breech block lugs into grooves behind the breech lugs. A typical bayonet connection comprises a long cylindric plug with a single radial lug near the outer end of the plug and a long socket with a cylindric center space and an outer radial space extending into the socket to receive the plug into said extended spaces in the socket. A groove is inside the socket behind a radial lug portion of the socket and adjacent to the radial space that extends inside from the face of the socket. The plug is inserted into the socket and turned through a short arc to guide the lug on the plug into the groove in the socket. This connector is used, for example, to attach a bayonet to a rifle. Connectors of this kind are referred to herein as plug and socket connectors. We use that term to define connectors which cooperate to join two elements by means of a plug on one such element and a complementary socket on the other such element, wherein the plug is inserted in the socket and turned a fraction of one turn to engage mating parts of the plug and socket and thus make a secure joint. An advantage of such connectors is that they can be readily disconnected and reconnected without damaging the joint. Other plug and socket connectors of this kind can be used for the invention instead of the one described in detail above.

In variations of the invention, when using a plug and socket connector of the kind described above, the plug and socket could be fitted with more or fewer than three corresponding lugs on each member, e.g. one or a plurality from two to four or more lugs on each member. In other variations, the connection can be tightened or locked in its closed position by means other than the matching tapered surfaces described. It could be fixed, for example, by means of a set screw through the rim of the socket to bear against and fasten a lug on the plug at its closed position inside the socket, for example. These and other variations and equivalents of the invention defined by the following claims are within the intended scope of our invention.

We claim:

1. In an airbag module comprising an airbag and a canister which contains an inflator and which is connected in the module for inflation of the airbag by gas issuing into the canister from said inflator and thence into the airbag, the improvement wherein said inflator is fastened inside said canister by a plug and socket connector comprising a plug member including at least one lug and a socket member including a groove, one member of the plug and socket connector being fixed on the inflator and the other member being fixed to a wall of said canister and said members being connected to join the inflator and the canister by inserting the plug member into the socket member and turning one of said plug member and socket member relative to the other member through an arc of less than one turn so that the at least one lug on the plug member engages the groove on the socket member.

2. The improvement defined by claim 1 wherein the inflator comprises a cylinder containing gas generating means and said cylinder comprises a closed end.

3. The improvement defined by claim 2 wherein the plug member of the plug and socket connector is fastened at the closed end of the cylinder, with the plug member being concentric with the cylinder, and the socket member is fastened inside the canister to the wall of the canister.

4. The improvement defined by claim 1 wherein said plug member comprises:

a circular plug wherein said at least one lug is a radial lug which extends outward from a center base on the circular plug and having a radial space at each side of said at least one radial lug, and said socket member comprises:

a circular socket which comprises a circular base, an outer cylindric rim and at least one radial socket lug which extends inward from said rim defining sectors of a circular face and which defines said groove inside the circular socket between said circular base and said at least one socket lug, a radial socket space at either side of each said socket lug and an open center space at the face of said socket member, the radial lugs on the plug member corresponding respectively with the radial socket spaces on the socket member to permit said insertion of said plug member in said socket member.

5. The improvement defined by claim 4 wherein the at least one radial lug on said circular plug is tapered on a surface of said lug that mates with a tapered surface inside the at least one radial socket lug on said circular socket for tightening the circular plug in the circular socket when the plug member and socket member of the connector are engaged.

6. The improvement defined by claim 4 wherein the circular plug comprises a plurality of said radial lugs defining the radial spaces between said radial lugs on said circular plug and the circular socket comprises more than one of said radial socket lugs defining radial spaces between said radial socket lugs wherein the radial lugs and center base of said circular plug fit through the said radial spaces and said open center space, respectively, in the face of the socket member.

7. An improved inflator, for use with an airbag module of the type including a canister having a socket defining a groove, the inflator comprising:

a) a hollow metal cylinder containing a gas-generating material and an igniter, the hollow metal cylinder having at least one opening for releasing inflation gas therefrom, and the hollow metal cylinder having a closed end;

b) a plug member extending from the closed end of the metal cylinder, the plug member including at least one lug, the plug member configured to be receivable in the socket of the canister such that each of the at least one lug of the plug member would be in locking interengagement with the groove of the canister socket upon relative rotation of less than one turn between the plug member and canister socket.

8. An improved canister, for use in an airbag module of the type including an inflator comprising a hollow metal cylinder containing a gas-generating material and an igniter, the hollow metal cylinder having at least one opening for releasing inflation gas therefrom, and the hollow metal cylinder having a closed end, a plug member extending from the closed end of the metal cylinder, the plug member including at least one lug, the improved canister comprising:

a) an open-topped container formed by first and second side walls, a bottom wall and first and second end walls;

b) a socket member extending from said first end wall, the socket member defining a recessed groove, the recessed socket groove configured to receive the at least one lug of the inflator plug member in locking interengagement upon relative rotation of less than one turn between the canister socket and the inflator plug.

9. An improved inflator as claimed in claim 7 wherein the plug member comprises a circular plug wherein said at least one lug is a radial lug which extends outward from a center base on the circular plug and defining a radial space at each side of said at least one radial lug, said at least one radial lug on said circular plug is tapered on a surface of said lug that is mateable with the groove of the canister socket.

10. An improved canister as claimed in claim 7 wherein the plug member comprises a circular plug, said at least one lug comprises a plurality of radial lugs defining radial spaces between each of said radial lugs on said circular plug, each of said radial lugs being tapered on a surface of each of said lugs that is mateable with the groove of the canister socket.

11. An improved canister as claimed in claim 8 wherein the socket member comprises a circular socket comprising a circular base, an outer cylindric rim and at least one radial socket lug extending inward from said rim defining sectors of a circular face and defining said groove inside the circular socket, a radial socket space at each side of each of said at least one socket lug and an open center space at the face of said socket member, said at least one radial socket lug on said socket member being tapered on a surface of said socket lug that is mateable with a lug of the inflator plug member.

12. An improved canister as claimed in claim 8 wherein the socket member comprises a circular socket comprising a circular base, an outer cylindric rim and a plurality of radial socket lugs which extend inward from said rim defining sectors of a circular face and defining said groove inside the circular socket, a radial socket space at each side of each said socket lug and an open center space at the face of said socket member, each said radial socket lugs on said socket member being tapered on a surface of each of said lugs that is mateable with a lug of the inflator plug member.

* * * * *

UNITED STATES PATENT AND TRADEMARK OFFICE
CERTIFICATE OF CORRECTION

PATENT NO. : 5,454,587
DATED : 3 October 1995
INVENTOR(S) : Rick L. Halford et al.

It is certified that error appears in the above-indentified patent and that said Letters Patent is hereby corrected as shown below:

At column 5, line 36, "through an are of less" should be --through an arc of less--.

At column 5, line 65, "member in said socket member" should be --member into said socket member--.

Signed and Sealed this

Thirtieth Day of July, 1996

Attest:

BRUCE LEHMAN

*Attesting Officer*    *Commissioner of Patents and Trademarks*